(12) United States Patent
Delachanal

(10) Patent No.: US 10,187,607 B1
(45) Date of Patent: Jan. 22, 2019

(54) SYSTEMS AND METHODS FOR USING A VARIABLE CAPTURE FRAME RATE FOR VIDEO CAPTURE

(71) Applicant: GOPRO, INC., San Mateo, CA (US)

(72) Inventor: Christophe Delachanal, Lumbin (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/478,979

(22) Filed: Apr. 4, 2017

(51) Int. Cl.
    *H04N 7/01*     (2006.01)
    *H04N 5/232*     (2006.01)

(52) U.S. Cl.
    CPC ....... *H04N 7/0127* (2013.01); *H04N 5/23245* (2013.01)

(58) Field of Classification Search
    CPC .......... H04N 5/23245; H04N 7/0127
    See application file for complete search history.

(56) References Cited

U.S. PATENT DOCUMENTS

| | | | |
|---|---|---|---|
| 98,897 A | 1/1870 | Thorn | |
| 563,528 A | 7/1896 | Willson | |
| 5,432,871 A | 7/1995 | Novik | |
| 6,384,862 B1 | 5/2002 | Brusewitz | |
| 6,434,265 B1 | 8/2002 | Xiong | |
| 6,486,908 B1 | 11/2002 | Chen | |
| 6,710,740 B2 | 3/2004 | Needham | |
| 6,711,293 B1 | 3/2004 | Lowe | |
| 6,788,333 B1 | 9/2004 | Uyttendaele | |
| 7,092,012 B2 | 8/2006 | Nakamura | |
| 7,403,224 B2 | 7/2008 | Fuller | |
| 7,545,434 B2* | 6/2009 | Bean | H04N 5/232 348/229.1 |
| 7,623,176 B2 | 11/2009 | Hoshino | |

(Continued)

FOREIGN PATENT DOCUMENTS

| | | |
|---|---|---|
| EP | 0605045 A1 | 7/1994 |
| EP | 0650299 A1 | 4/1995 |
| EP | 0661672 A1 | 7/1995 |

OTHER PUBLICATIONS

U.S. Appl. No. 14/920,427, filed Oct. 22, 2015, entitled "Apparatus and Methods for Embedding Vietadata Into Video Stream" 62 pages.

(Continued)

*Primary Examiner* — Shahbaz Nazrul
(74) *Attorney, Agent, or Firm* — Sheppard Mullin Richter & Hampton LLP

(57) ABSTRACT

An image sensor may generate visual output signals conveying visual information within a field of view of the image sensor. First and second video information defining first and video content may be generated based on the visual output signals. The first video content may be captured using a first capture frame rate and the second video content may be captured using a second capture frame rate. Motion of the image sensor and/or motion of an object within the field of view may be determined. The first capture frame rate may be changed based on the determined motion. Third video information defining third video content may be generated based on the first video information and the second video information. The third video content may include one or more frames of the first video content and one or more frames of the second video content.

20 Claims, 6 Drawing Sheets

(56) References Cited

U.S. PATENT DOCUMENTS

| | | | |
|---|---|---|---|
| 7,777,790 B2* | 8/2010 | Feuer | H04N 7/01 348/222.1 |
| 7,983,502 B2 | 7/2011 | Cohen | |
| 8,044,992 B2 | 10/2011 | Kurebayashi | |
| 8,265,455 B2* | 9/2012 | Shinkai | H04N 9/8205 386/224 |
| 8,355,055 B2* | 1/2013 | Chen | H04N 5/232 348/208.3 |
| 8,411,166 B2 | 4/2013 | Miyata | |
| 8,442,383 B2* | 5/2013 | Furumoto | H04N 5/2356 348/139 |
| 8,443,398 B2 | 5/2013 | Swenson | |
| 8,606,073 B2 | 12/2013 | Woodman | |
| 8,644,702 B1 | 2/2014 | Kalajan | |
| 8,670,030 B2 | 3/2014 | Tanaka | |
| 8,736,748 B2* | 5/2014 | Takita | H04N 5/2353 348/221.1 |
| 8,842,197 B2 | 9/2014 | Singh | |
| 8,890,954 B2 | 11/2014 | O'Donnell | |
| 8,896,694 B2 | 11/2014 | O'Donnell | |
| 9,001,217 B2 | 4/2015 | Kinoshita | |
| 9,019,396 B2 | 4/2015 | Kiyoshige | |
| 9,056,676 B1 | 6/2015 | Wang | |
| 9,106,872 B2 | 8/2015 | Tsurumi | |
| 9,342,534 B2 | 5/2016 | Singh | |
| 9,412,278 B1 | 8/2016 | Gong | |
| 9,473,758 B1 | 10/2016 | Long | |
| 9,602,795 B1 | 3/2017 | Matias | |
| 9,787,900 B2* | 10/2017 | Weckel | H04N 5/23267 |
| 2002/0112005 A1 | 8/2002 | Namias | |
| 2002/0122113 A1 | 9/2002 | Foote | |
| 2002/0191087 A1 | 12/2002 | Hashimoto | |
| 2003/0085992 A1 | 5/2003 | Arpa | |
| 2004/0021780 A1 | 2/2004 | Kogan | |
| 2004/0047606 A1 | 3/2004 | Mikawa | |
| 2004/0061667 A1 | 4/2004 | Sawano | |
| 2004/0075738 A1 | 4/2004 | Burke | |
| 2004/0135900 A1 | 7/2004 | Pyle | |
| 2004/0169724 A1 | 9/2004 | Ekpar | |
| 2004/0174434 A1 | 9/2004 | Walker | |
| 2004/0239763 A1 | 12/2004 | Notea | |
| 2005/0033760 A1 | 2/2005 | Fuller | |
| 2005/0052553 A1* | 3/2005 | Kido | H04N 5/232 348/296 |
| 2005/0062869 A1 | 3/2005 | Zimmermann | |
| 2005/0104976 A1 | 5/2005 | Currans | |
| 2005/0134707 A1 | 6/2005 | Perotti | |
| 2005/0289111 A1 | 12/2005 | Tribble | |
| 2006/0050997 A1 | 3/2006 | Imamura | |
| 2006/0195876 A1 | 8/2006 | Calisa | |
| 2007/0030358 A1 | 2/2007 | Aoyama | |
| 2007/0120986 A1 | 5/2007 | Nunomaki | |
| 2007/0140662 A1 | 6/2007 | Nunomaki | |
| 2007/0279494 A1 | 12/2007 | Aman | |
| 2008/0094499 A1 | 4/2008 | Ueno | |
| 2008/0118100 A1 | 5/2008 | Hayashi | |
| 2009/0118896 A1 | 5/2009 | Gustafsson | |
| 2009/0217343 A1 | 8/2009 | Bellwood | |
| 2009/0251558 A1 | 10/2009 | Park | |
| 2009/0262206 A1 | 10/2009 | Park | |
| 2010/0045773 A1 | 2/2010 | Ritchey | |
| 2010/0097443 A1 | 4/2010 | Lablans | |
| 2010/0228418 A1 | 9/2010 | Whitlow | |
| 2010/0238304 A1 | 9/2010 | Miyata | |
| 2010/0289924 A1 | 11/2010 | Koshikawa | |
| 2010/0299630 A1 | 11/2010 | McCutchen | |
| 2011/0115883 A1 | 5/2011 | Kellerman | |
| 2011/0141300 A1 | 6/2011 | Stec | |
| 2011/0157459 A1* | 6/2011 | Chen | H04N 5/232 348/367 |
| 2011/0261227 A1 | 10/2011 | Higaki | |
| 2012/0098981 A1 | 4/2012 | Ip | |
| 2012/0143482 A1 | 6/2012 | Goossen | |
| 2012/0199689 A1 | 8/2012 | Burkland | |
| 2012/0199698 A1 | 8/2012 | Thomasson | |
| 2012/0206565 A1 | 8/2012 | Villmer | |
| 2012/0242798 A1 | 9/2012 | Mcardle | |
| 2012/0257071 A1* | 10/2012 | Prentice | H04N 5/23238 348/220.1 |
| 2013/0058619 A1 | 3/2013 | Miyakawa | |
| 2013/0127903 A1 | 5/2013 | Paris | |
| 2013/0132462 A1 | 5/2013 | Moorer | |
| 2013/0176403 A1 | 7/2013 | Varga | |
| 2013/0182177 A1 | 7/2013 | Furlan | |
| 2013/0210563 A1 | 8/2013 | Hollinger | |
| 2013/0235226 A1 | 9/2013 | Karn | |
| 2013/0314442 A1 | 11/2013 | Langlotz | |
| 2014/0037268 A1 | 2/2014 | Shoji | |
| 2014/0049652 A1 | 2/2014 | Moon | |
| 2014/0067162 A1 | 3/2014 | Paulsen | |
| 2014/0211987 A1 | 7/2014 | Fan | |
| 2014/0240122 A1 | 8/2014 | Roberts | |
| 2014/0267544 A1 | 9/2014 | Li | |
| 2014/0270480 A1 | 9/2014 | Boardman | |
| 2015/0055937 A1 | 2/2015 | Van Hoff | |
| 2015/0058102 A1 | 2/2015 | Christensen | |
| 2015/0134673 A1 | 5/2015 | Golan | |
| 2015/0186073 A1 | 7/2015 | Pacurariu | |
| 2015/0189221 A1 | 7/2015 | Nakase | |
| 2015/0287435 A1 | 10/2015 | Land | |
| 2015/0296134 A1 | 10/2015 | Cudak | |
| 2015/0341550 A1 | 11/2015 | Lay | |
| 2015/0346722 A1 | 12/2015 | Herz | |
| 2015/0362917 A1 | 12/2015 | Wang | |
| 2016/0005435 A1 | 1/2016 | Campbell | |
| 2016/0055883 A1 | 2/2016 | Soll | |
| 2016/0104284 A1 | 4/2016 | Maguire | |
| 2016/0112713 A1 | 4/2016 | Russell | |
| 2016/0117829 A1 | 4/2016 | Yoon | |
| 2016/0155472 A1* | 6/2016 | Elg | G11B 27/005 386/223 |
| 2016/0180197 A1 | 6/2016 | Kim | |
| 2016/0234438 A1 | 8/2016 | Satoh | |
| 2016/0239340 A1 | 8/2016 | Chauvet | |
| 2016/0269621 A1 | 9/2016 | Cho | |
| 2016/0274582 A1 | 9/2016 | Banda | |
| 2016/0308813 A1 | 10/2016 | Kalajan | |
| 2016/0313732 A1 | 10/2016 | Seydoux | |
| 2016/0313734 A1 | 10/2016 | Enke | |
| 2016/0366290 A1 | 12/2016 | Hoshino | |
| 2017/0015405 A1 | 1/2017 | Chau | |
| 2017/0023939 A1 | 1/2017 | Krouse | |
| 2017/0359549 A1* | 12/2017 | Baran | H04N 5/772 |

OTHER PUBLICATIONS

U.S. Appl. No. 14/927,343, filed Oct. 29, 2015, entitled "Apparatus and Methods for Rolling Shutter Compensation for Multi-Camera Systems" 45 pages.

U.S. Appl. No. 14/949,786, filed Nov. 23, 2015, entitled "Apparatus and Methods for Image Alignment" 67 pages.

Benjamin Meyer et al: "Real-time Free-Viewpoint Navigation from Compressed Multi-Video Recordings", Proc. 3D Data Processing, Visualization and Transmission (3DPVT), May 31, 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].

Farin et al., "Shortest Circular Paths on Planar Graphs," In 27th Symposium on Information Theory in the Benelux 2006, 8 pgs.

Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].

Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA,IEEE, US, vol. 3, Jul. 30, 2000 (Jul.

(56) References Cited

OTHER PUBLICATIONS 30, 2000), pp. 1419-1422, XP010512772, DOI: 10.1109/ICME. 2000.871033 ISBN: 978-0-7803-6536-0.
Hossein Afshari et al: "The Panoptic Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.
Lipski, C.: "Virtual video camera", SIGGRAPH '09: Posters on, SIGGRAPH '09, vol. 0, Jan. 1, 2009 (Jan. 1, 2009), pp. 1-1, XP055091257, New York, New York, USA DOI: 10.1145/1599301. 1599394.
Mai Zheng et al: "Stitching Video from Webcams", Dec. 1, 2008 (Dec. 1, 2008), Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, p. 420-429, XP019112243, ISBN: 978-3-540-89645-6 le document en entier.
PCT International Search Report for PCT/EP2014/057352 dated Jun. 27, 2014, 3 pages.
PCT International Search Report for PCT/EP2014/058008 dated May 26, 2014, 3 pages.
PCT International Search Report for PCT/EP2014/061897 dated Sep. 15, 2014, 3 pages.
Perazzi et al., "Panoramic Video from Unstructured Camera Arrays," Eurographics, vol. 34 (2015), No. 2, 12pgs.
Ryan Jackson: 'Shooting 360-degree video with four GoPro HD Hero cameras / Ryan Jackson Photography' Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.
Zhi et al., "Toward Dynamic Image Mosaic Generation With Robustness to Parallax," IEEE Transactions on Image Processing, vol. 21, No. 1, Jan. 2012, pp. 366-378.
U.S. Appl. No. 15/001,038, filed Jan. 19, 2016, entitled "Metadata Capture Apparatus and Methods" 54 pages.

\* cited by examiner

SYSTEMS AND METHODS FOR USING A VARIABLE CAPTURE FRAME RATE FOR VIDEO CAPTURE

FIELD

This disclosure relates to capturing video content using a variable capture frame rate that changes based on motion of an image sensor and/or motion of an object captured by the image sensor.

BACKGROUND

A user may wish to use a high capture frame rate (e.g., 60 frames per second) to capture video content of a high-speed activity and a low capture frame rate (e.g., 24 frames per second) to capture video content of a low-speed activity. Setting a capture frame rate at the beginning of video content capture may result in video content being captured using undesired capture frame rate. For example, a user may set a low capture frame rate to capture a low-speed activity. The low-speed activity may turn into a high-speed activity. The video content may include a capture of the high speed activity captured using the low capture frame rate.

SUMMARY

This disclosure relates using a variable capture frame rate for video capture. An image sensor may be configured to generate visual output signals conveying visual information within a field of view of the image sensor. A motion sensor may be configured to generate motion output signals conveying motion information of the image sensor. First video information defining first video content and second video information defining second video content may be generated based on the visual output signals. The first video content may be captured using a first capture frame rate set to a first value and the second video content may be captured using a second capture frame rate set to a second value.

A motion of the image sensor may be determined based on the motion output signals and/or a motion of an object within the field of view of the image sensor may be determined based on the visual output signals. The value of the first capture frame rate may be changed to a third value based on the motion of the image sensor and/or the motion of the object. Third video information defining third video content may be generated based on the first video information and the second video information. The third video content may include one or more frames of the first video content and one or more frames of the second video content. The third video information may be generated based on the first value being lower than the second value and the third value.

A system that uses a variable capture frame rate for video capture may include one or more of an image sensor, a motion sensor, one or more processors, and/or other components. The image sensor may be configured to generate visual output signals conveying visual information within a field of view of the image sensor. In some implementations, the image sensor may include one or more of a charge-coupled device sensor, an active pixel sensor, a complementary metal-oxide semiconductor sensor, an N-type metal-oxide-semiconductor sensor, and/or other image sensors.

The motion sensor may be configured to generate motion output signals conveying motion information of the image sensor. In some implementations, the motion sensor may include one or more of an accelerometer, a gyroscope, a magnetometer, an inertial measurement unit, a magnetic position sensor, a radio-frequency position sensor, and/or other motion sensors. Motion information may define one or more motions of the motion sensor/object monitored by the motion sensor (e.g., camera in which the motion sensor and the image sensor are located). Motion information may define one or more motions of the image sensor with respect to a fixed reference (e.g., Earth).

The processor(s) may be configured by machine-readable instructions. Executing the machine-readable instructions may cause the processor(s) to facilitate using a variable capture frame rate for video capture. The machine-readable instructions may include one or more computer program components. The computer program components may include one or more of a video information component, a motion component, a frame rate component, a combination component, and/or other computer program components.

The video information component may be configured to generate video information defining video content based on the visual output signals and/or other information. Video content may have a progress length. Different video content may be captured using different capture frame rates. The video information component may generate first video information defining first video content based on the visual output signals and/or other information. The first video content may be captured using a first capture frame rate. The first capture frame rate may be set to a first value defining a first number of frames captured per a duration of time. The first video content may include one or more frames. The first video content may have a first progress length.

The video information component may generate second video information defining second video content based on the visual output signals and/or other information. The second video content may be captured using a second capture frame rate. The second capture frame rate may be set to a second value defining a second number of frames captured per the duration of time. The second video content may include one or more frames. The second video content may have a second progress length. In some implementations, the second progress length may be shorter than the first progress length. In some implementations, the second video information may be stored in a buffer memory and/or other locations.

The motion component may be configured to determine a motion of the image sensor and/or the motion of one or more objects within the field of view of the image sensor. The motion of the image sensor may be determined based on the motion output signals and/or other information. In some implementations, the motion of the image sensor be characterized by linear and/or angular speed, linear and/or angular velocity, linear and/or angular acceleration, linear and/or angular direction, and/or other information. The motion of the object(s) may be determined based on the visual output signals. In some implementations, the motion of the object(s) be characterized by linear and/or angular speed, linear and/or angular velocity, linear and/or angular acceleration, linear and/or angular direction, and/or other information. In some implementations, the motion of the object(s) may be determined based on one or more motion vectors and/or other information.

In some implementations, the motion of the image sensor and/or the motion of the object(s) may be determined at a moment corresponding to a point in the second progress length of the second video content. In some implementations, a time duration may exist between (1) the determination of the motion of the image sensor and/or the motion of the object(s) and (2) the changing of the first capture frame rate from the first value to the third value. The time duration may correspond to a range in the second progress length of the second video content.

The frame rate component may be configured to change the first capture frame rate from the first value to a third value based on the motion of the image sensor, the motion of the object(s), and/or other information. The frame rate component may determine the third value based on the motion of the image sensor, the motion of the object(s), and/or other information.

The combination component may be configured to generate third video information defining third video content based on the first video information, the second video information, and/or other information. The third video information may be generated based on the first value defining a lower number of frames captured per the duration of time than (1) the second value, and (2) the third value. The third video content may include one or ore frames of the first video content, one or more frames of the second video content, and/or other frames. In some implementations, the third video content may include one or more interpolated frames generated from two or more frames of the first video content, the second video content, and/or other frames.

In some implementations, some or all of the frames of the second video content included in the third video content may correspond to a range in the second progress length before the point in the second progress length. The point may correspond to the moment at which the motion of the image sensor and/or the motion of the object(s) may have been determined.

In some implementations, some or all of the frames of the second video content included in the third video content may correspond to the range in the second progress length corresponding to the time duration between (1) the determination of the motion of the image sensor and/or the motion of the object(s) and (2) the changing of the first capture frame rate from the first value to the third value.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
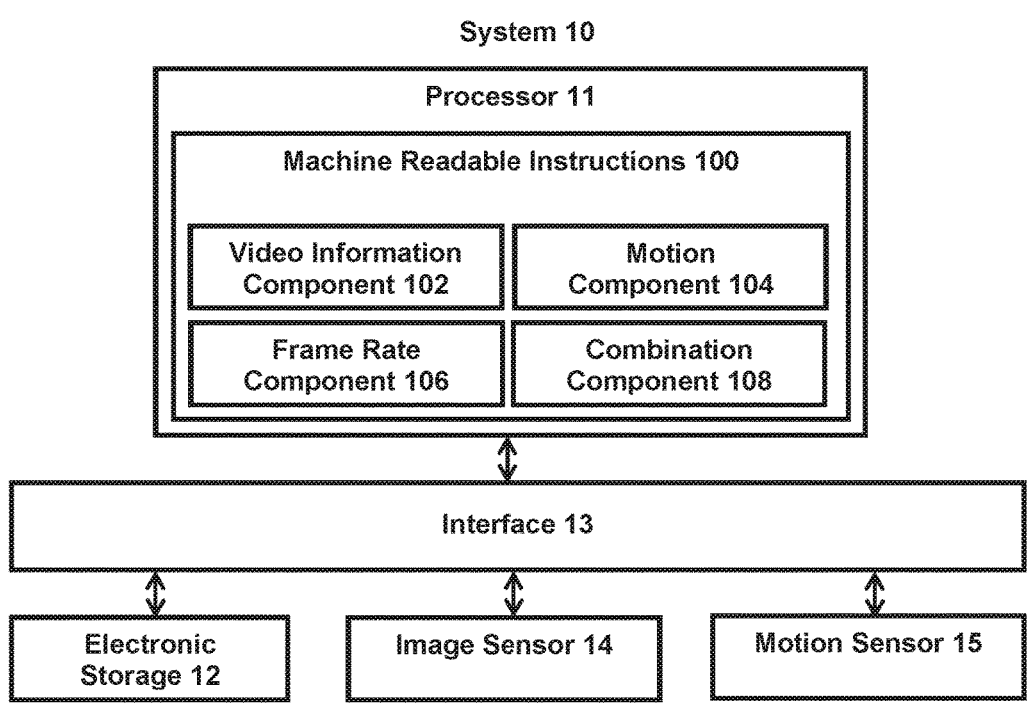
FIG. 1 illustrates a system that uses a variable capture frame rate for video capture.

FIG. 1 illustrates a system 10 that uses a variable capture frame rate for video capture. The system 10 may include one or more of a processor 11, an electronic storage 12, an interface 13 (e.g., bus, wireless interface), an image sensor 14, a motion sensor 15, and/or other components. The image sensor 14 may be configured to generate visual output signals conveying visual information within a field of view of the image sensor 14. The motion sensor 15 may be configured to generate motion output signals conveying motion information of the image sensor 14. First video information defining first video content and second video information defining second video content may be generated based on the visual output signals. The first video content may be captured using a first capture frame rate set to a first value and the second video content may be captured using a second capture frame rate set to a second value. The values of the first capture frame rate and the second capture frame rate may define the numbers of frames captured per a duration of time.

A motion of the image sensor 14 may be determined based on the motion output signals and/or a motion of an object within the field of view of the image sensor 14 may be determined based on the visual output signals. The value of the first capture frame rate may be changed to a third value based on the motion of the image sensor and/or the motion of the object. Third video information defining third video content may be generated based on the first video information and the second video information. The third video content may include one or more frames of the first video content and one or more frames of the second video content. The third video information may be generated based on the first value being lower than the second value and the third value.

The image sensor 14 may be configured to generate visual output signals conveying visual information within a field of view of the image sensor 14. The field of view may define the extent of a scene observable by the image sensor 14 from a given position/orientation. In some implementations, one or more objects may be moving within the field of view of the image sensor 14 and the visual information may include information relating to the motion of the object(s). For example, visual information may include visual content captured by the image sensor 14 and motion of object(s) within the field of view of the image sensor 14 may result in motion of (at least a portion of) the visual content captured by the image sensor 14. In some implementations, the image sensor 14 may include one or more of a charge-coupled device sensor, an active pixel sensor, a complementary metal-oxide semiconductor sensor, an N-type metal-oxide-semiconductor sensor, and/or other image sensors.

The motion sensor 15 may be configured to generate motion output signals conveying motion information of the image sensor 14. In some implementations, the motion sensor 15 may include one or more of an accelerometer, a gyroscope, a magnetometer, an inertial measurement unit, a magnetic position sensor, a radio-frequency position sensor, and/or other motion sensors.

Motion information may define one or more motions of the motion sensor 15/object monitored by the motion sensor (e.g., camera in which the motion sensor 15 and the image sensor 14 are located). Motion of the image sensor 14 may include one or more of changes in position of the image sensor 14, changes in orientation (e.g., yaw, pitch, roll) of the image sensor 14, and/or other motion of the image sensor 14 at a time or over a period of time, and/or at a location or over a range of locations. Motions of the image sensor 14 may be characterized by linear and/or angular speed, linear and/or angular velocity, linear and/or angular acceleration, linear and/or angular direction, and/or other information.

Motion information may define one or more motions of the image sensor 14 with respect to a fixed reference (e.g., Earth). For example, the image sensor 14 may be carried by a person and the motion information may define one or more motions of the image sensor 14 as the image sensor 14 is moved by the person/as a result of the motion of the person. The image sensor 14 may be mounted to a vehicle and the motion information may define one or more motions of the image sensor 14 as the image sensor is moved by the vehicle/as a result of the motion of the vehicle. Other motion of the image sensor 14 are contemplated.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to the image sensor 14, the motion sensor 15, video information, video content, capture frame rate, motion of the image sensor 14, motion of an object within the field of view of the image sensor 14, frames, and/or other information.

In some implementations, the electronic storage 12 may store video information defining one or more video content. Video content may refer to media content that may be consumed as one or more videos. Video content may include one or more videos stored in one or more formats/container, and/or other video content. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by different video applications.

Video content may have a progress length. A progress length may be defined in terms of time durations (e.g., capture time, view time) and/or frame numbers (e.g., number of captured frames). For example, video content may include a video having a time duration of 60 seconds. Video content may include a video having 1800 video frames. Video content having 1800 video frames may have a time duration of 60 seconds when captured/viewed at 30 frames/second. Other time durations and frame numbers are contemplated.

Referring to FIG. 1, processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate using a variable capture frame rate for video capture. Machine readable instructions 100 may include one or more computer program components. Machine readable instructions 100 may include one or more of video information component 102, motion component 104, frame rate component 106, combination component 108, and/or other computer program components.

The video information component 102 may be configured to generate video information defining video content based on the visual output signals and/or other information. Different video content may be captured using different capture frame rates. The video information component 102 may generate first video information defining first video content based on the visual output signals and/or other information. The first video content may include one or more frames. The first video content may have a first progress length.

Figure 3A:
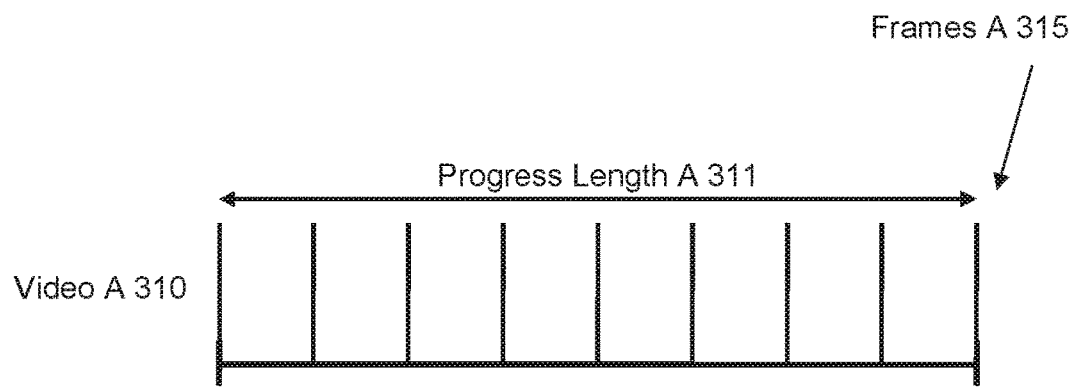
FIGS. 3A-3D illustrate example videos captured by an image sensor.

The first video content may be captured using a first capture frame rate. The first capture frame rate may be set to a first value defining a first number of frames captured per a duration of time. The first capture frame rate may change based on motion of the image sensor 14 and/or motion of one or more objects within the field of view of the image sensor 14. For example, FIG. 3A illustrates an example video A 310 captured using the first capture frame rate. The video A 310 may include frames A 315 and/or other frames. The video A 310 may have a progress length A 311.

The first video information may be stored in one or more storage locations. A storage location may include electronic storage 12, electronic storage of one or more image sensors (not shown in FIG. 1), electronic storage of a device accessible via a network, and/or other locations.

The video information component 102 may generate second video information defining second video content based on the visual output signals and/or other information. The second video content may include one or more frames. The second video content may have a second progress length. In some implementations, the second progress length may be shorter than the first progress length. The second video content may include a shorter time duration and/or a fewer number of frames than the first video content.

Figure 3B:
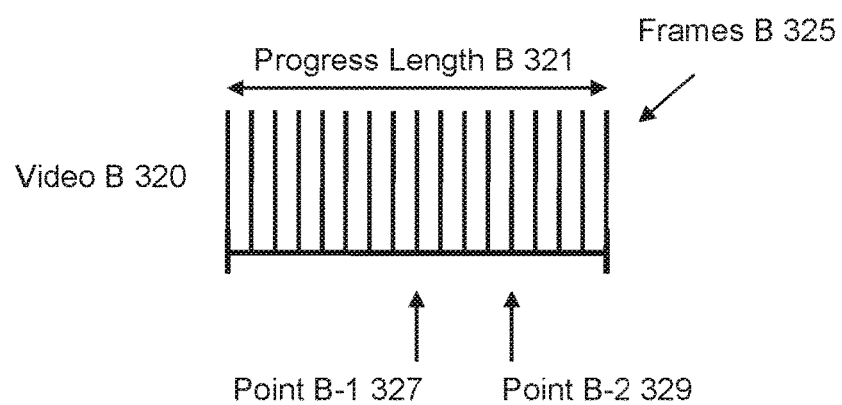

The second video content may be captured using a second capture frame rate. The second capture frame rate may be set to a second value defining a second number of frames captured per the duration of time. For example, FIG. 3B illustrates an example video B 320 captured using the second capture frame rate. The second capture frame rate may be higher (define a higher number of frames per a duration of time) than the first capture frame rate. The video B 320 may include frames B 325. The video B 320 may have a progress length B 321, which may be shorter than progress length A 311. The second capture frame rate may be set to effectuate a high speed capture of the second video content.

In some implementations, the second capture frame rate may change based on the value of the first capture frame rate. For example, the image sensor 14 may be capable of capturing video content at 120 frames per second (fps). Using 120 fps to always capture the second video content may result in expenditure of more resources (e.g., computing power/time, memory storage) than necessary. The second capture frame rate may be set based on the value of the first capture frame rate so that the second capture frame rate changes based on changes in the first capture frame rate. For example, the first capture frame rate may be set to 24 fps and the second capture frame rate may be set to 48 fps. Based on the first capture frame rate increasing, the second capture frame rate may be increased (e.g., to 60 fps). Based on the first capture frame rate decreasing, the second capture frame rate may be decreased (e.g., to 48 fps). The second frame rate may be set to be higher than the first capture frame rate.

The second video information may be stored in one or more storage locations. A storage location may include electronic storage 12, electronic storage of one or more image sensors (not shown in FIG. 1), electronic storage of a device accessible via a network, and/or other locations. In some implementations, the second video information may be stored in a buffer memory and/or other locations. Storage of the second video information in the buffer memory may enable the system 10 to generate video information based on the first video information and the second information.

The motion component 104 may be configured to determine motion of the image sensor 14 and/or motion of one or more objects within the field of view of the image sensor 14. Determining the motion of the image sensor 14 and/or the object(s) within the field of view of the image sensor 14 may enable system 10 to change one or more capture frame rates based on the determined motion(s). For example, one or more capture frame rates may be changed based on acceleration/deceleration of the image sensor 14 and/or acceleration/deceleration of the object(s) within the field of view of the image sensor 14.

The motion of the image sensor 14 may be determined based on the motion output signals generated by the motion sensor 15 and/or other information. The motion of the image sensor 14 may be determined with respect to a fixed reference (e.g., Earth). In some implementations, the motion of the image sensor 14 may include one or more of changes in position of the image sensor 14, changes in orientation (e.g., yaw, pitch, roll) of the image sensor 14, and/or other motion of the image sensor 14 at a time or over a period of time, and/or at a location or over a range of locations. Motions of the image sensor 14 may be characterized by linear and/or angular speed, linear and/or angular velocity, linear and/or angular acceleration, linear and/or angular direction, and/or other information.

The motion of the object(s) may be determined based on the visual output signals and/or other information. The object(s) may be moving within the field of view of the image sensor 14 and the visual information conveyed by the visual output signals may include information relating to the motion of the object(s). The visual information may include visual content captured by the image sensor 14 and motion of the object(s) may result in motion of one or more portions of the visual content captured by the image sensor 14. In some implementations, the motion of the object(s) may be characterized by linear and/or angular speed, linear and/or angular velocity, linear and/or angular acceleration, linear and/or angular direction, and/or other information.

In some implementations, the motion of the object(s) may be determined based on one or more motion vectors and/or other information. Motion vectors may represent motion of one or more visuals captured within frames of video content and/or other information. Motion may exist within frames due to motion of the image sensor 14 and/or due to motion of the object(s) captured within the video frames. Motion vectors may be determined using one or more of block-matching algorithm, phase correlation and frequency domain methods, pixel recursive algorithms, optical flow, feature detection, and/or other criteria matching methods.

In some implementations, the motion of the image sensor 14 and/or the motion of the object(s) may be determined at a moment corresponding to a point in the second progress length of the second video content. For example, referring to FIG. 3B, the motion of the image sensor 14 and/or the motion of the object(s) may be determined at a moment corresponding to a point B-1 327. In some implementations, a time duration may exist between (1) the determination of the motion of the image sensor 14 and/or the motion of the object(s) and (2) the changing of the first capture frame rate (e.g., from the first value to a third value). The time duration may correspond to a range in the second progress length of the second video content. For example, referring to FIG. 3B, the changing of the first capture frame rate may occur at a moment corresponding to a point B-2 329. The time duration may correspond to the range in the progress length B 321 between the point B-1 327 and the point B-2 329.

The frame rate component 106 may be configured to change the first capture frame rate from the first value to a third value based on the motion of the image sensor 14, the motion of the object(s), and/or other information. The frame rate component 106 may determine the third value based on the motion of the image sensor 14, the motion of the object(s), and/or other information. The frame rate component 106 may include or retrieve information (e.g., a database) that matches the determined motion of the image sensor 14 and/or the object(s) to a value (e.g., the third value) for the first capture frame rate.

Figure 3C:
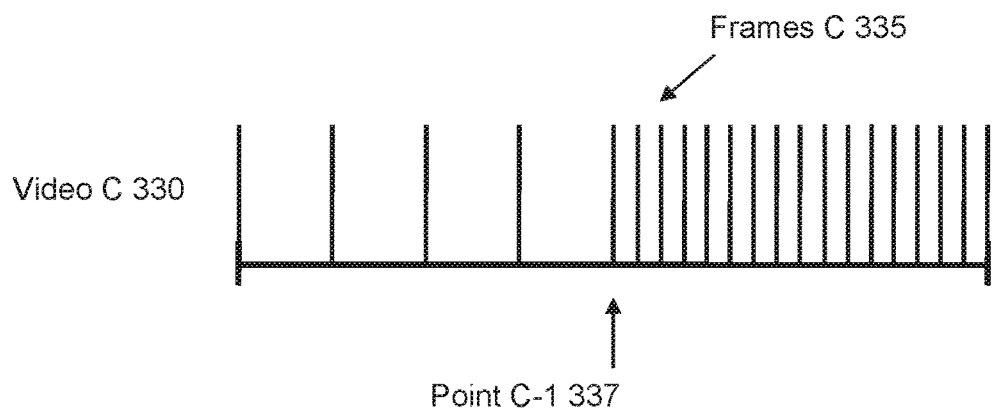

For example, FIG. 3C illustrates an example video C 330 captured using a variable first capture frame rate. As shown in FIG. 3C, the first capture frame rate may change (e.g., increase) at a moment corresponding to a point C-1 337. Video C 330 may be defined by a greater number of frames per a duration of time following the point C-1 337 than the same duration of time prior to the point C-1 337. The point C-1 337 may correspond to the moment at which the motion of the image sensor 14 and/or the motion of the object(s) may be determined. The point C-1 337 may correspond to the same moment as the point B-1 327.

Figure 3D:
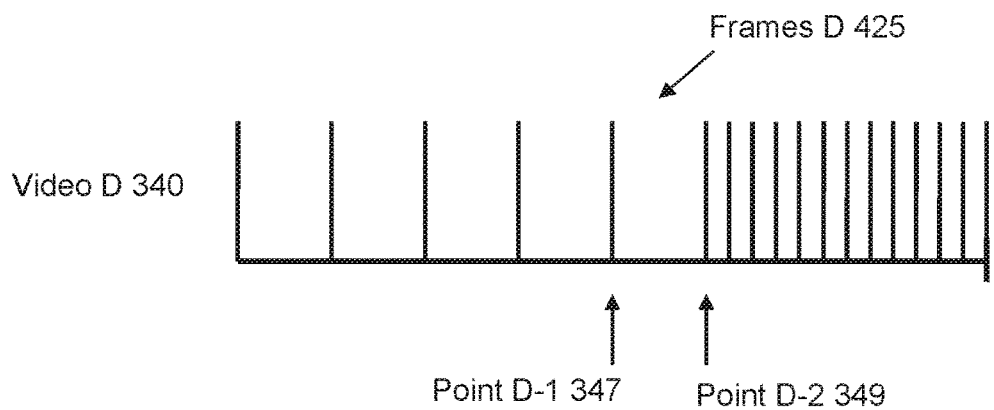

In some implementations, a time duration may exist between (1) the determination of the motion of the image sensor 14 and/or the motion of the object(s) and (2) the changing of the first capture frame rate (e.g., from the first value to the third value). For example, FIG. 3D illustrates an example video D 340 captured using a variable first capture frame rate. As shown in FIG. 3D, the first capture frame rate may change (e.g., increase) at a moment corresponding to a point D-2 349. Video D 340 may be defined by a greater number of frames per a duration of time following the point D-2 349 than the same duration of time prior to the point D-2 349. The point D-2 349 may correspond to the same moment as the point B-2 329. A point D-1 347 may correspond to the moment at which the motion of the image sensor 14 and/or the motion of the object(s) may be determined. The point D-1 347 may correspond to the same moment as the point B-1 327.

The combination component 108 may be configured to generate third video information defining third video content based on the first video information, the second video information, and/or other information. The third video information may be generated based on the first value defining a lower number of frames captured per the duration of time than (1) the second value, and (2) the third value. The third video content may include one or more frames of the first video content, one or more frames of the second video content, and/or other frames. The third video content may include a combination of some or all of the first video content, some or all of the second video content, and/or other video content.

In some implementations, some or all of the frames of the second video content included in the third video content may correspond to a range in the second progress length before the point in the second progress length corresponding to the moment at which the motion of the image sensor 14 and/or the motion of the object(s) may have been determined. Including frames from the second video content prior to this point may enable the combination component 108 to compensate for the amount of time taken by the motion component 104 to determine the motion of the image sensor 14 and/or the object(s) within the field of view of the image sensor 14 and/or the amount of time taken by the frame rate component 106 to determine that a change in the first capture frame rate is needed based on the determined motion of the image sensor 14/object(s).

The range of frames (e.g., number of frames) from the second video content that is included in the third video content may be preset or dynamically determined. For example, the combination component 108 may include in the third video content a set number of frames/frames corresponding to a set amount of duration preceding the point corresponding to the moment at which the motion of the image sensor 14/object(s) may have been determined. The combination component 108 may vary the number of frames/duration from the second video content that is included in the third video content. For example, the number of frames/duration from the second video content that is included in the third video content may be determined based on the original value of the first capture frame rate (e.g., the first value), the changed value of the first capture frame rate (e.g., the third value), the difference between the original and changed first capture frame rate (e.g., the difference between the first value and the third value), the value of the second capture frame rate (e.g., the second value), the determined motion of the image sensor 14/object(s) within the field of view of the image sensor 14, and/or other information.

In some implementations, some or all of the frames of the second video content included in the third video content may correspond to the range in the second progress length corresponding to the time duration between (1) the determination of the motion of the image sensor 14 and/or the motion of the object(s) and (2) the changing of the first capture frame rate from the first value to the third value. Including such frames from the second video content in the third video content may enable the combination component 108 to compensate for the amount of time taken by the frame rate component 106 to change the first capture frame rate.

Figure 4A:
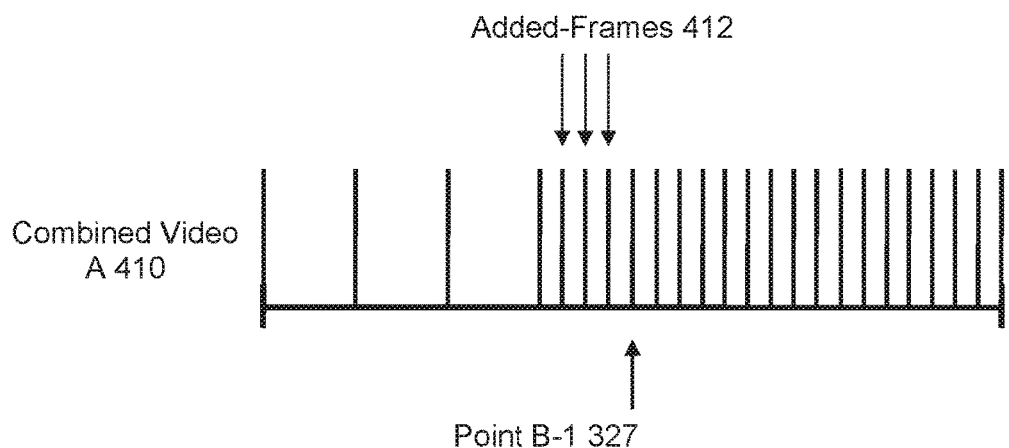
FIGS. 4A-4D illustrate example combined videos.

FIGS. 4A-4D illustrate example combined videos 410, 420, 430, 440. The combined video A 410 (shown in FIG. 4A) may be generated based on the video B 320 (shown in FIG. 3B) and the video C 330 (shown in FIG. 3C). As shown in FIG. 4A, the combination component 108 may add added-frames 412 (comprising frames from the video B 320) before the point B-1 327/point C-1 337 to the video C 330 to generate the combined video A 410. Other frames from the video B 320 may be included in the combined video A 410. For example, one or more frames from the video B 320 (e.g., a frame preceding the added-frames 412) may replace one or more frames from the video C 330 in the combined video A 410.

Figure 4B:
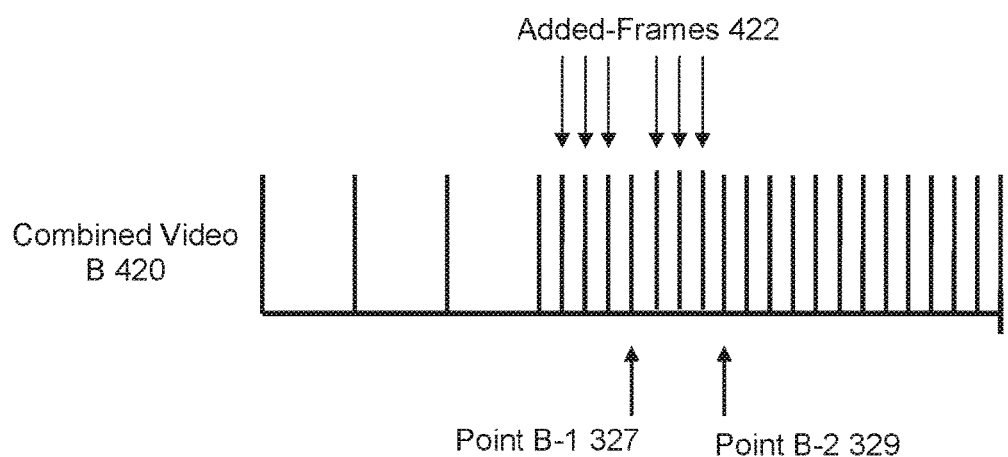

The combined video B 420 (shown in FIG. 4B) may be generated based on the video B 320 (shown in FIG. 3B) and the video D 340 (shown in FIG. 3D). As shown in FIG. 4B, the combination component 108 may add added-frames 422 (comprising frames from the video B 320) before the point B-1 327/point D-1 347 and before the point B-2 329/point D-2 349 to the video D 340 to generate the combined video B 420. Other frames from the video B 320 may be included in the combined video B 420. For example, one or more frames from the video B 320 (e.g., a frame preceding/between the added-frames 422) may replace one or more frames from the video D 340 in the combined video B 420.

Figure 4C:
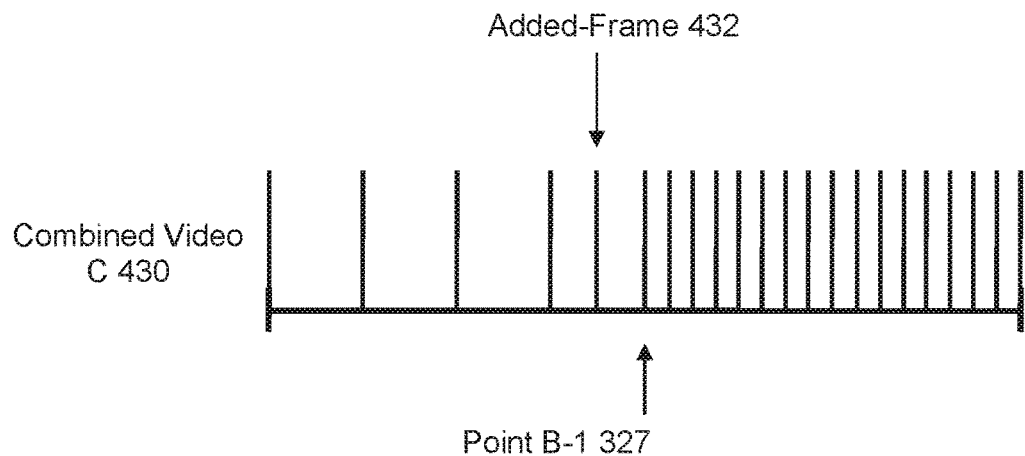

The combined video C 430 (shown in FIG. 4C) may be generated based on the video B 320 (shown in FIG. 3B) and the video C 330 (shown in FIG. 3C). As shown in FIG. 4C, the combination component 108 may add an added-frame 432 (comprising a frame from the video B 320) before the point B-1 327/point C-1 337 to the video C 330 to generate the combined video C 430. Other frames from the video B 320 may be included in the combined video C 430. For example, one or more frames from the video B 320 (e.g., a frame preceding the added-frame 432) may replace one or more frames from the video C 330 in the combined video C 430.

In some implementations, the third video content may include one or more interpolated frames generated from two or more frames of the first video content, the second video content, and/or other frames. For example, the third video content may include one or more interpolated frames generated from two or more frames of the first video content. The third video content may include one or more interpolated frames generated from two or more frames of the second video content. The third video content may include one or more interpolated frames generated from two or more frames of the first video content and the second video content (e.g., an interpolated frame generated from a frame of the first video content and a frame of the second video content).

Figure 4D:
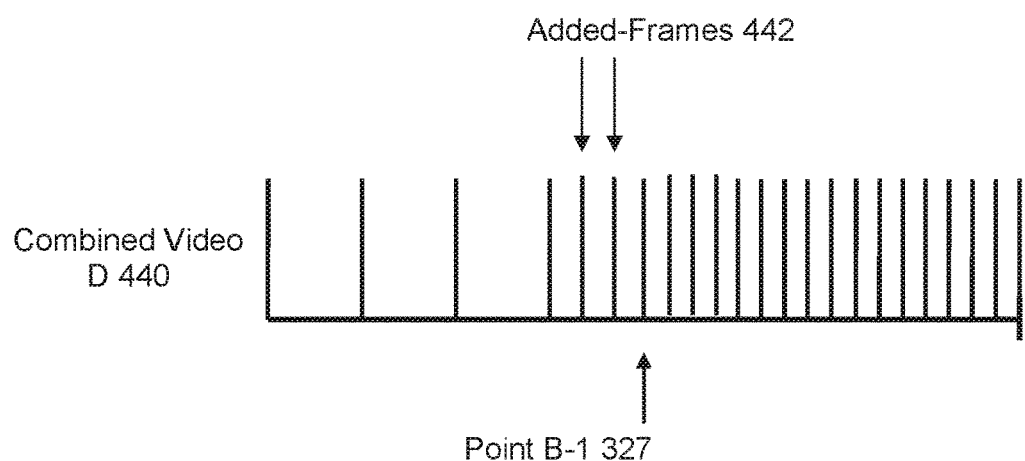

For example, the combined video D 440 (shown in FIG. 4D) may be generated based on the video B 320 (shown in FIG. 3B) and the video C 330 (shown in FIG. 3C). As shown in FIG. 4D, the combination component 108 may add added-frames 442 (comprising interpolated video frames) before the point B-1 327/point C-1 337 to the video C 330 to generate the combined video D 440. The added-frames 442 may be interpolated from frames of the video C 330, frames of the video B 320, and/or frames of the video C 330 and frames of the video B 320. Other frames from the video B 320 may be included in the combined video D 440. For example, one or more frames from the video B 320 (e.g., a frame preceding the added-frames 442) may replace one or more frames from the video C 330 in the combined video D 440.

In some implementations, the change in the first capture frame rate may result in changes in perceived speed with which video content is presented during playback. For example, video content may include a capture of a surfer (e.g., captured from a head/body/surfboard-mounted camera) waiting for a wave and then riding a wave. The first capture frame rate may initially be set to 24 fps. While the surfer is waiting for the wave, the video content may be generated using the 24 fps. When the surfer takes off and surfs the wave, the first capture frame rate may be changed to 48 fps (e.g., based on detected motion of the camera). The portion of the video content captured using the 24 fps may be presented during playback at a normal speed (e.g., 1× speed). The portion of the video content captured using the 48 fps may be presented during playback at a slow motion speed (e.g., 0.5× speed).

In some implementations, the generation of the third video content may result in changes in perceived speed with which video content is presented during playback. For example, based on the above described change in the first capture frame rate, the third video content may include frames from the second video content preceding the moment at which the motion of the camera was determined and/or the first capture frame rate was changed. The portion of the video content included from the second video content may be presented during playback at a slow motion speed. Portions surrounding the video content included from the second video content may be presented during playback with a slow/fast motion speed. Other changes in the perceived speed of playback are contemplated.

In some implementations, video content may include one or more of spherical video content, virtual reality content, and/or other video content. Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components 102, 104, 106, and/or 108 may be eliminated, and some or all of its functionality may be provided by other computer program components. As another example, processor 11 may be configured to execute one or more additional computer program components that may perform some or all of the functionality attributed to one or more of computer program components 102, 104, 106, and/or 108 described herein.

The electronic storage media of the electronic storage 12 may be provided integrally (i.e., substantially non-removable) with one or more components of the system 10 and/or removable storage that is connectable to one or more components of system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Although the image sensor 14 is depicted in FIG. 1 as a single element, this is not intended to be limiting. The image sensor 14 may include one or more image sensors in one or more locations.

Although the motion sensor 15 is depicted in FIG. 1 as a single element, this is not intended to be limiting. The motion sensor 15 may include one or more motion sensors in one or more locations.

Figure 2:
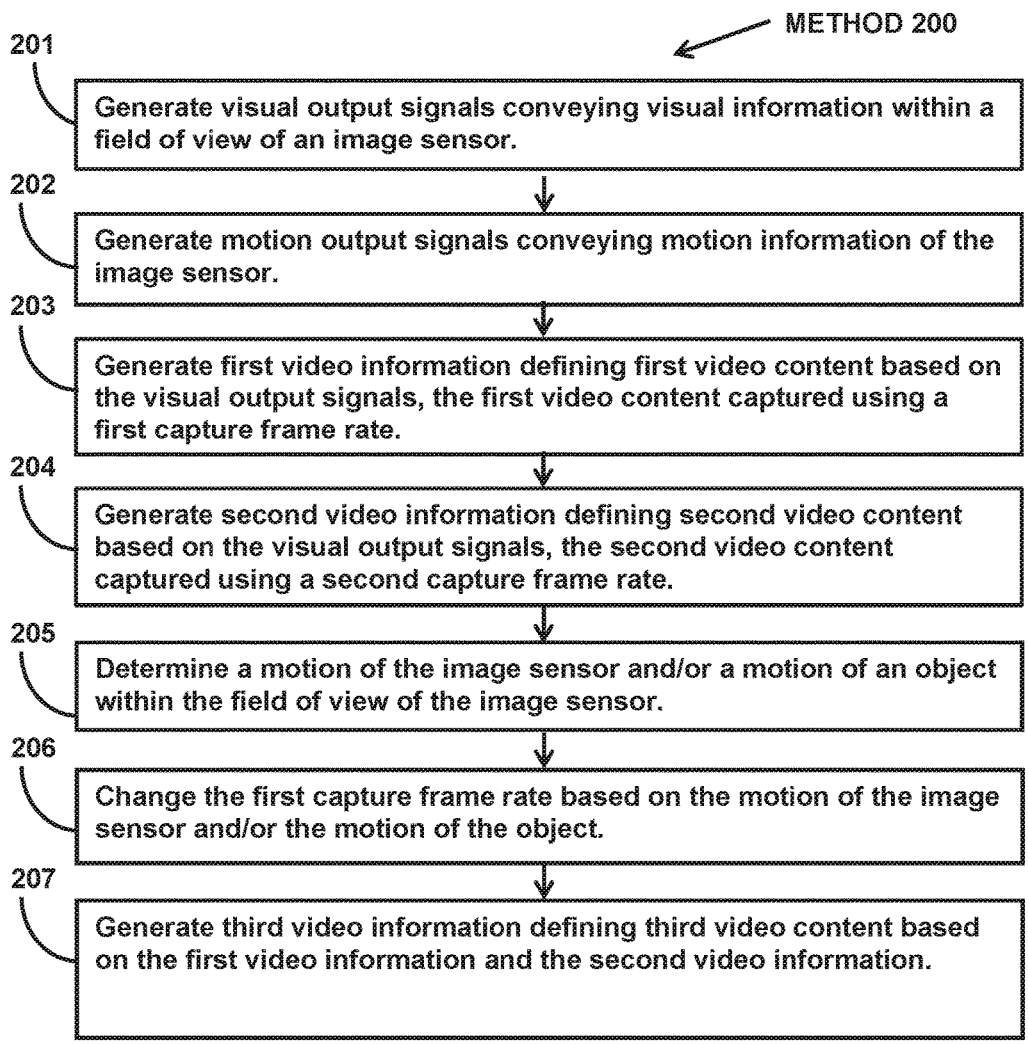
FIG. 2 illustrates a method for using a variable capture frame rate for video capture.

FIG. 2 illustrates method 200 for using a variable capture frame rate for video capture. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, visual output signals may be generated. The visual output signals may convey visual information within a field of view of an image sensor. In some implementations, operation 201 may be performed by one or more sensors the same as or similar to the image sensor 14 (Shown in FIG. 1 and described herein).

At operation 202, motion output signals may be generated. The motion output signals may convey motion information of the image sensor. In some implementations, operation 202 may be performed by one or more sensors the same as or similar to motion sensor 15 (Shown in FIG. 1 and described herein).

At operation 203, first video information defining first video content may be generated. The first video information may be generated based on the visual output signals. The first video content may be captured using a first capture frame rate. The first capture frame rate may be set to a first value defining a first number of frames captured per a duration of time. The first video content may have a first progress length. In some implementations, operation 203 may be performed by a processor component the same as or similar to the video information component 102 (Shown in FIG. 1 and described herein).

At operation 204, second video information defining second video content may be generated. The second video information may be generated based on the visual output signals. The second video content may be captured using a second capture frame rate. The second capture frame rate may be set to a second value defining a second number of frames captured per the duration of time. The second video content may have a second progress length. In some implementations, operation 204 may be performed by a processor component the same as or similar to the video information component 102 (Shown in FIG. 1 and described herein).

At operation 205, a motion of the image sensor and/or the motion of an object within the field of view of the image sensor may be determined. The motion of the image sensor may be determined based on the motion output signals. The motion of the object may be determined based on the visual output signals. In some implementations, operation 205 may be performed by a processor component the same as or similar to the motion component 104 (Shown in FIG. 1 and described herein).

At operation 206, the first capture frame rate may be changed from the first value to a third value. The first capture frame rate may be changed based on the motion of the image sensor and/or the motion of the object. In some implementations, operation 206 may be performed by a processor component the same as or similar to the frame rate component 106 (Shown in FIG. 1 and described herein).

At operation 207, third video information defining third video content may be generated. The third video information may be generated based on the first video information and the second video information. The third video content may include one or more frames of the first video content and one or more frames of the second video content. The third video information may be generated based on the first value defining a lower number of frames captured per the duration of time than (1) the second value, and (2) the third value. In some implementations, operation 207 may be performed by a processor component the same as or similar to the combination component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system using a variable capture frame rate for video capture, the system comprising:
   an image sensor configured to generate visual output signals conveying visual information within a field of view of the image sensor;
   a motion sensor configured to generate motion output signals conveying motion information of the image sensor;
   one or more physical processors configured by machines readable instructions to:
      generate first video information defining first video content based on the visual output signals, the first video content captured using a first capture frame rate, the first capture frame rate set to a first value defining a first number of frames captured per a duration of time, the first video content having a first progress length;
      generate second video information defining second video content based on the visual output signals, the second video content captured using a second capture frame rate, the second capture frame rate set to a second value defining a second number of frames captured per the duration of time, the second video content having a second progress length;
      determine a motion of the image sensor based on the motion output signals and/or a motion of an object within the field of view of the image sensor based on the visual output signals;

change the first capture frame rate from the first value to a third value based on the motion of the image sensor and/or the motion of the object, wherein a frame rate-change time duration exists between (1) the determination of the motion of the image sensor and/or the motion of the object and (2) the change of the first capture frame rate from the first value to the third value; and generate third video information defining third video content based on the first video information and the second video information, the third video content including (i) one or more frames of the first video content, and (ii) one or more frames of the second video content corresponding to the frame rate-change time duration, the third video information generated based on the first value defining a lower number of frames captured per the duration of time than (1) the second value, and (2) the third value.

2. The system of claim 1, wherein the third video content includes one or more interpolated frames generated from two or more frames of the first video content and/or the second video content.

3. The system of claim 1, wherein:
the motion of the image sensor and/or the motion of the object is determined at a moment corresponding to a point in the second progress length of the second video content; and
some or all of the frames of the second video content included in the third video content corresponds to a range in the second progress length before the point in the second progress length.

4. The system of claim 1, wherein including the one or more frames of the second video content corresponding to the frame rate-change time duration in the third video content compensates for an amount of time taken to change the first capture frame rate from the first value to the third value.

5. The system of claim 1, wherein the second video information is stored in a buffer memory.

6. The system of claim 1, wherein the second progress length is shorter than the first progress length.

7. The system of claim 1, wherein the motion of the image sensor includes one or more of a linear speed, an angular speed, a linear velocity, an angular velocity, a linear acceleration, and/or an angular acceleration of the image sensor.

8. The system of claim 1, wherein the motion of the object includes one or more of a linear speed, an angular speed, a linear velocity, an angular velocity, a linear acceleration, and/or an angular acceleration of the object.

9. The system of claim 1, wherein the motion of the object is determined based on one or more motion vectors.

10. A method using a variable capture frame rate for video capture, the method comprising:
generating visual output signals conveying visual information within a field of view of an image sensor;
generating motion output signals conveying motion information of the image sensor;
generating first video information defining first video content based on the visual output signals, the first video content captured using a first capture frame rate, the first capture frame rate set to a first value defining a first number of frames captured per a duration of time, the first video content having a first progress length;
generating second video information defining second video content based on the visual output signals, the second video content captured using a second capture frame rate, the second capture frame rate set to a second value defining a second number of frames captured per the duration of time, the second video content having a second progress length;

determining a motion of the image sensor based on the motion output signals and/or a motion of an object within the field of view of the image sensor based on the visual output signals;

changing the first capture frame rate from the first value to a third value based on the motion of the image sensor and/or the motion of the object, wherein a frame rate-change time duration exists between (1) the determination of the motion of the image sensor and/or the motion of the object and (2) the change of the first capture frame rate from the first value to the third value; and generating third video information defining third video content based on the first video information and the second video information, the third video content including (i) one or more frames of the first video content, and (ii) one or more frames of the second video content corresponding to the frame rate-change time duration, the third video information generated based on the first value defining a lower number of frames captured per the duration of time than (1) the second value, and (2) the third value.

11. The method of claim 10, wherein the third video content includes one or more interpolated frames generated from two or more frames of the first video content and/or the second video content.

12. The method of claim 10, wherein:
the motion of the image sensor and/or the motion of the object is determined at a moment corresponding to a point in the second progress length of the second video content; and
some or all of the frames of the second video content included in the third video content corresponds to a range in the second progress length before the point in the second progress length.

13. The method of claim 10, wherein including the one or more frames of the second video content corresponding to the frame rate-change time duration in the third video content compensates for an amount of time taken to change the first capture frame rate from the first value to the third value.

14. The method of claim 10, wherein the second video information is stored in a buffer memory.

15. The method of claim 10, wherein the second progress length is shorter than the first progress length.

16. The method of claim 10, wherein the motion of the image sensor includes one or more of a linear speed, an angular speed, a linear velocity, an angular velocity, a linear acceleration, and/or an angular acceleration of the image sensor.

17. The method of claim 10, wherein the motion of the object includes one or more of a linear speed, an angular speed, a linear velocity, an angular velocity, a linear acceleration, and/or an angular acceleration of the object.

18. The method of claim 10, wherein the motion of the object is determined based on one or more motion vectors.

19. A system using a variable capture frame rate for video capture, the system comprising:
an image sensor configured to generate visual output signals conveying visual information within a field of view of the image sensor;
a motion sensor configured to generate motion output signals conveying motion information of the image sensor;

one or more physical processors configured by machines readable instructions to:

generate first video information defining first video content based on the visual output signals, the first video content captured using a first capture frame rate, the first capture frame rate set to a first value defining a first number of frames captured per a duration of time, the first video content having a first progress length;

generate second video information defining second video content based on the visual output signals, the second video content captured using a second capture frame rate, the second capture frame rate set to a second value defining a second number of frames captured per the duration of time, the second video content having a second progress length, the second progress length being shorter than the first progress length, wherein the second video information is stored in a buffer memory;

determine a motion of the image sensor based on the motion output signals and/or a motion of an object within the field of view of the image sensor based on the visual output signals, the motion of the image sensor and/or the motion of the object determined at a moment corresponding to a point in the second progress length of the second video content;

change the first capture frame rate from the first value to a third value based on the motion of the image sensor and/or the motion of the object, wherein a frame rate-change time duration exists between (1) the determination of the motion of the image sensor and/or the motion of the object and (2) the change of the first capture frame rate from the first value to the third value; and generate third video information defining third video content based on the first video information and the second video information, the third video content including (i) one or more frames of the first video content, and (ii) one or more frames of the second video content corresponding to the frame rate-change time duration, some or all of the frames of the second video content included in the third video content corresponding to a range in the second progress length before the point in the second progress length, the third video information generated based on the first value defining a lower number of frames captured per the duration of time than (1) the second value, and (2) the third value.

20. The system of claim 19, wherein the third video content includes one or more interpolated frames generated from two or more frames of the first video content and/or the second video content.

* * * * *